US012753057B2

(12) United States Patent
Shirai et al.

(10) Patent No.: US 12,753,057 B2
(45) Date of Patent: Oct. 6, 2026

(54) ALERT SYSTEM

(71) Applicant: Mitsubishi Logisnext Co., Ltd., Kyoto (JP)

(72) Inventors: Masayuki Shirai, Kyoto (JP); Ryusuke Kurino, Kyoto (JP)

(73) Assignee: Mitsubishi Logisnext Co., Ltd., Kyoto (JP)

(*) Notice: Subject to any disclaimer, the term of this patent is extended or adjusted under 35 U.S.C. 154(b) by 0 days.

(21) Appl. No.: 18/786,569

(22) Filed: Jul. 28, 2024

(65) Prior Publication Data

US 2025/0270081 A1 Aug. 28, 2025

(30) Foreign Application Priority Data

Feb. 26, 2024 (JP) ................................ 2024-026748

(51) Int. Cl.
*B66F 17/00* (2006.01)

(52) U.S. Cl.
CPC .................................. *B66F 17/003* (2013.01)

(58) Field of Classification Search
CPC ................................ B66F 17/003; B66F 9/24
See application file for complete search history.

(56) References Cited

U.S. PATENT DOCUMENTS 9,731,950 B2* 8/2017 Yamada ................ B66F 17/003
2004/0154871 A1* 8/2004 Allerding ................. B66F 9/24 187/287
2009/0236182 A1* 9/2009 Yamagami ................ B66F 9/24 187/222
2010/0145551 A1* 6/2010 Pulskamp ............ B66F 17/003 701/2

(Continued)

FOREIGN PATENT DOCUMENTS

CA 3186454 7/2023
JP 2006188353 7/2006

(Continued)

OTHER PUBLICATIONS

"Search Report of Europe Counterpart Application", issued on Jan. 27, 2025, p. 1-p. 9.

*Primary Examiner* — Kurt Philip Liethen
(74) *Attorney, Agent, or Firm* — JCIPRNET

(57) ABSTRACT

An alert system includes a vehicle control unit controlling a traveling device and a cargo handling device, an alarm device outputting an alarm by sound and/or light, and an information processing device connected to the vehicle control unit and the alarm device. The information processing device includes an event detection unit detecting a hazardous event based on vehicle information, an alarm control unit activating the alarm device when the event detection unit detects any of the hazardous events, and causes the alarm device to output an alarm, and a restriction command unit transmitting a restriction command to the vehicle control unit to restrict operation of the cargo handling vehicle when the event detection unit detects a part of specific hazardous events among the hazardous events. When receiving the restriction command, the vehicle control unit restricts traveling operation of the traveling device and/or cargo handling operation of the cargo handling device.

10 Claims, 3 Drawing Sheets

(56) References Cited

U.S. PATENT DOCUMENTS

| | | | | |
|---|---|---|---|---|
| 2013/0197760 | A1* | 8/2013 | Castaneda | B60T 8/17 701/41 |
| 2018/0057049 | A1* | 3/2018 | Stewart | B62D 6/10 |
| 2018/0319594 | A1* | 11/2018 | Blevins | B65G 1/1375 |
| 2020/0039353 | A1* | 2/2020 | Chandrasekar | B60K 31/0058 |
| 2020/0095105 | A1* | 3/2020 | Yutzy | B66F 17/006 |
| 2020/0172384 | A1* | 6/2020 | Cadou | B66F 9/0655 |
| 2021/0276841 | A1* | 9/2021 | Borofka | B66F 7/0633 |
| 2022/0253071 | A1* | 8/2022 | Thode | B66F 17/003 |
| 2022/0281730 | A1* | 9/2022 | Masuda | B66F 17/006 |
| 2022/0411246 | A1* | 12/2022 | Kubotani | B60W 30/0953 |
| 2023/0227299 | A1* | 7/2023 | Akatsuka | B60W 30/095 701/50 |
| 2023/0271818 | A1* | 8/2023 | Le Du | B66F 17/003 187/223 |

FOREIGN PATENT DOCUMENTS

| | | |
|---|---|---|
| JP | 2016060630 | 4/2016 |
| JP | 2019003512 | 1/2019 |
| JP | 2020191828 | 12/2020 |
| JP | 2021172464 | 11/2021 |

* cited by examiner

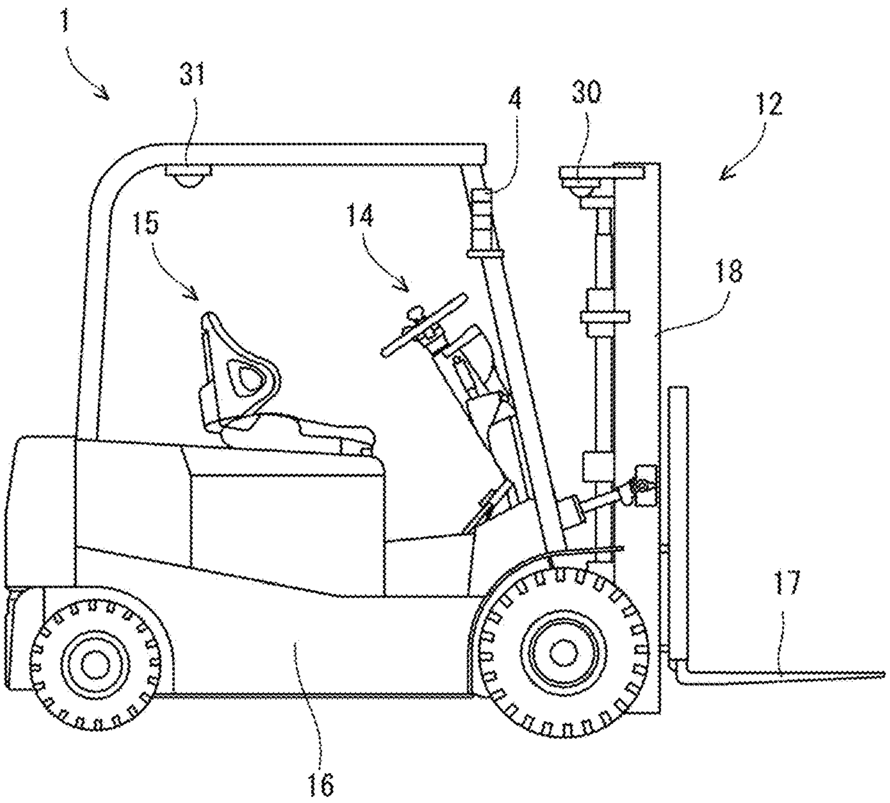

FIG. 2

| Hazardous event | | Alarm mode | | | Vehicle restriction mode | |
|---|---|---|---|---|---|---|
| | | Sound | Yellow (light) | Red (light) | Traveling restriction | Cargo handling restriction |
| A | Speeding | – | ○ | – | – | – |
| A | Lift up traveling (with/without cargo) | – | ○ | – | – | – |
| A | Lift down traveling (with/without cargo) | – | ○ | – | – | – |
| A | Sudden deceleration (sudden braking) | ○ | – | ○ | – | – |
| A | Sudden start | ○ | – | ○ | – | – |
| B | Sudden turn | ○ | – | ○ | ○ | – |
| C | Overload | ○ | – | ○ | ○ | ○ |
| C | Lift up, traveling, and turning (with cargo) | ○ | – | ○ | ○ | ○ |
| C | Lift down, traveling, and turning (with cargo) | ○ | – | ○ | ○ | ○ |
| C | Collision with objects | ○ | ○ | ○ | ○ | ○ |
| C | Cargo collapse | ○ | ○ | ○ | ○ | ○ |

FIG. 3

ALERT SYSTEM

CROSS-REFERENCE TO RELATED APPLICATION

This application claims the priority benefits of Japanese application no. 2024-026748, filed on Feb. 26, 2024. The entirety of the above-mentioned patent application is hereby incorporated by reference herein and made a part of this specification.

BACKGROUND

Technical Field

The present application relates to an alert system that is applied to a cargo handling vehicle and notifies an operator of the cargo handling vehicle of the occurrence of a hazardous event.

Description of Related Art

An operation management system is sometimes adopted as an option to manage the operating status of a cargo handling vehicle such as a forklift (refer to, for example, Patent Literature 1 (Japanese Patent Application Laid-Open No. 2019-3512), Patent Literature 2 (Japanese Patent Application Laid-Open No. 2006-188353), Patent Literature 3 (Japanese Patent Application Laid-Open No. 2020-191828) and Patent Literature 4 (Japanese Patent Application Laid-Open No. 2021-172464)).

For example, in such a system, an on-board device including a data logger is mounted on a cargo handling vehicle, vehicle information of the cargo handling vehicle (for example, vehicle acceleration, speed, cargo load, etc.) is acquired and transmitted to a network server as operating status. In addition, the on-board device detects a hazardous event (such as a sudden start or a sudden turn) based on the vehicle information. When the on-board device detects a hazardous event, the information is also transmitted to the network server, and video of the surroundings of the cargo handling vehicle before and after the occurrence of the hazardous event captured by the camera is also transmitted to the network server.

An administrator can, by accessing the network server from his/her own terminal, check operating status and video that includes the occurrence of the hazardous event, and use the information to take measures to appropriately prevent hazardous driving by the operator.

The systems in Patent Literature 1 and 2 also function as alert systems, the on-board device outputs an alarm using sound or light when a hazardous event occurs, in order to notify the operator of the occurrence of the hazardous event and encourage the operator to modify his/her operation. The system of Patent Literature 2 further calculates the degree of danger and changes the output of the alarm in accordance with the degree of danger.

Such a sound and light alarm alone may not be enough to deter hazardous behavior, as the operator may become accustomed to the alarm and ignore the alarm without modifying his/her operation.

The present application provides an alert system that makes an operator of a cargo handling vehicle more aware of a specific hazardous event when the event occurs.

SUMMARY

The alert system of the present application includes:

a vehicle control unit which controls a traveling device and a cargo handling device of a cargo handling vehicle;

an alarm device which is mounted on the cargo handling vehicle and outputs an alarm by sound and/or light; and an information processing device which is mounted on the cargo handling vehicle and is connected to the vehicle control unit and the alarm device.

The information processing device includes an event detection unit which detects a plurality of hazardous events that has been defined related to a behavior or a cargo handling state of the cargo handling vehicle in a distinguishable manner based on vehicle information regarding the cargo handling vehicle from the vehicle control unit, an alarm control unit which activates the alarm device when the event detection unit detects any of the hazardous events, and causes the alarm device to output an alarm, and a restriction command unit which transmits a restriction command to the vehicle control unit to restrict operation of the cargo handling vehicle when the event detection unit detects a part of specific hazardous events among the hazardous events.

The vehicle control unit restricts traveling operation of the traveling device and/or cargo handling operation of the cargo handling device when receiving the restriction command from the information processing device.

For example, the specific hazardous events include a first specific hazardous event and a second specific hazardous event different from the first specific hazardous event, and the vehicle control unit may restrict merely one of the traveling operation and the cargo handling operation when the event detection unit detects the first specific hazardous event, and may restrict both the traveling operation and the cargo handling operation when the event detection unit detects the second specific hazardous event.

For example, restriction of the traveling operation may be to set the maximum traveling speed of the cargo handling vehicle to a non-zero value that is lower than the maximum traveling speed before the restriction.

For example, the cargo handling device is provided with forks for supporting cargo, and restriction of the cargo handling operation may be to set the maximum lift speed of the forks to a non-zero value that is lower than the maximum lift speed before the restriction.

For example, the vehicle control unit may remove the restriction when it is detected that an operation unit for operating the cargo handling vehicle has been operated in a predetermined manner during the restriction of the traveling operation and/or the cargo handling operation.

For example, the alarm control unit may continue to output an alarm by sound and/or light until it is detected that an operation unit for operating the cargo handling vehicle has been operated in a predetermined manner based on the vehicle information after detection of the hazardous event.

In an example, the information processing device may include a processing unit including the event detection unit and an additional processing unit including the alarm control unit and the restriction command unit.

In the example, the processing unit may include a first event detection unit as the event detection unit, the additional processing unit may further include a second event detection unit as the event detection unit, and the second event detection unit may detect the hazardous event that is not detected by the first event detection unit.

The cargo handling vehicle is typically a forklift, but may be a cargo handling vehicle other than a forklift.

BRIEF DESCRIPTION OF THE DRAWINGS

FIG. 2 is a schematic side view of an exemplary cargo handling vehicle (forklift) to which the alert system of FIG. 1 is applied.

FIG. 3 is a table illustrating hazardous events and alarm modes and vehicle restriction modes set for each of the hazardous events.

DESCRIPTION OF THE EMBODIMENTS

Figure 1:
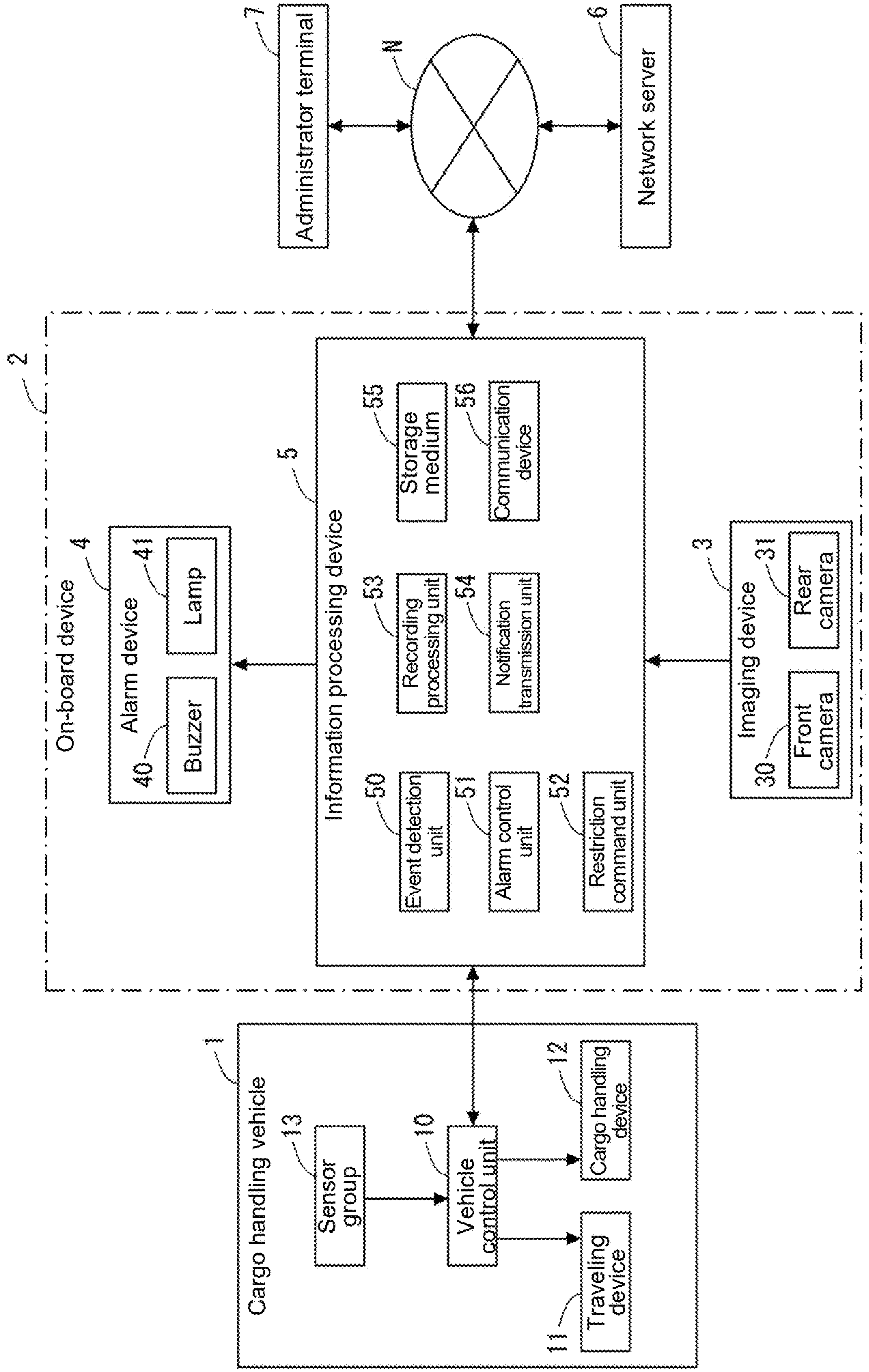
FIG. 1 is a schematic configuration diagram of an exemplary alert system.

Hereinafter, exemplary embodiments of the present application will be described with reference to the accompanying drawings. It should be noted that the components shown in the drawings are not necessarily in exact dimensions or proportions, but merely represent the functions or operations thereof. In addition, it should be understood that the same reference numbers are used throughout the figures to represent the same or similar components.

First Embodiment

FIG. 1 illustrates an alert system according to an example. As described in the Background section, the alert system is also an operation management system for managing the operating status of a cargo handling vehicle.

The alert system includes a cargo handling vehicle 1, an on-board device 2, a network server 6, and an administrator terminal 7.

The cargo handling vehicle 1 includes a vehicle control unit (vehicle controller) 10, a traveling device 11 for traveling the cargo handling vehicle 1, a cargo handling device 12 for handling cargo, and a sensor group 13 for acquiring vehicle information of the cargo handling vehicle 1.

As shown in FIG. 2, the cargo handling vehicle 1 is a forklift in the embodiment. The cargo handling vehicle 1 includes a vehicle body 16 having an operation unit 14 and a driver's seat 15. The operation unit 14 includes a steering wheel, an accelerator, a brake, a shift lever, a cargo handling lever (lift lever, etc.), and the like.

The cargo handling device 12 is provided at the front of the vehicle body 16. The cargo handling device 12 includes forks 17 for supporting cargo and a mast device 18 for raising and lowering the forks 17. The cargo handling device 12 may further include a tilt device for tilting the forks 17 and a reach device that moves the forks 17 and the mast device 18 back and forth relative to the vehicle body 16.

The vehicle control unit 10 in FIG. 1 is provided in the vehicle body 16, and the traveling device 11 is made up of drive wheels provided on the vehicle body 16 and a drive system that drives and steers the drive wheels.

The sensor group 13 is provided at various locations on the cargo handling vehicle 1 for controlling the cargo handling vehicle 1 and is composed of multiple sensors connected to the vehicle control unit 10. The sensors constituting the sensor group 13 include, for example, a speed sensor that detects the traveling speed of the cargo handling vehicle 1, an acceleration sensor that detects the acceleration of the cargo handling vehicle 1, a steering angle sensor that detects the steering angle (turning angle) of the running wheels of the cargo handling vehicle 1, a turning speed detection sensor that detects the turning speed, a load sensor that measures the weight of the cargo supported by the cargo handling device 12 (the forks 17 thereof), a lifting height sensor that detects the lifting height of the forks 17, and operation sensors (such as limit switches) that detect operation of each of members of the operation unit 14 (operation of the steering wheel, tilting of the shift lever or cargo handling lever, on/off of the accelerator or brake, etc.)

When an operator sits in the driver's seat 15 and operates the operation unit 14, a part of the sensors in the sensor group 13 detects the operation, and in response, the vehicle control unit 10 controls the traveling device 11 and/or the cargo handling device 12, thereby causing the cargo handling vehicle 1 to travel and/or handle cargo.

Information from each of the sensors constituting the sensor group 13 reflects the behavior and cargo handling state of the cargo handling vehicle 1. Therefore, the information from the sensor group 13 is vehicle information relating to the cargo handling vehicle 1.

The cargo handling vehicle 1 is not limited to an engine-powered forklift as shown in FIG. 2, but may be a battery-powered forklift. The cargo handling vehicle 1 may be a cargo handling vehicle other than a forklift.

The on-board device 2 is mounted on the existing cargo handling vehicle 1. The on-board device 2 records the operating status of the cargo handling vehicle 1, detects a hazardous event, captures video, transmits the operating status to the network server 6, as described below, outputs an alarm, and transmits a command to restrict the operation of the cargo handling vehicle 1.

The alert system of FIG. 1 also functions as an operation management system. The network server 6 stores information such as operating status and video transmitted from the on-board device 2 via a network N.

The administrator terminal 7 is a terminal operated by an administrator, and may be, for example, a smartphone, a tablet, or a PC. The administrator operates the administrator terminal 7 to access the network server 6 via the network N, and can check information such as operating status and video stored in the network server 6. The network server 6 and the administrator terminal 7 may be the same as the conventional ones, and detailed description thereof will be omitted here.

As shown in FIG. 1, the on-board device 2 includes an imaging device 3, an alarm device 4, and an information processing device 5.

The imaging device 3 captures video of the cargo handling vehicle 1 and the surroundings thereof. In the embodiment, the imaging device 3 is made up of two cameras: a front camera 30 and a rear camera 31. The front camera 30 and the rear camera 31 may each be, for example, a hemispherical camera with a 360° field of view. As shown in FIG. 2, the front camera 30 is attached to the top of the mast device 18 and captures video of the front side of the cargo handling vehicle 1. The rear camera 31 is attached to the head guard of the vehicle body 16 and captures video of the rear side of the cargo handling vehicle 1. In this way, video of the cargo handling vehicle 1 and the entire periphery thereof may be captured. The number of cameras in the imaging device 3 may be one or three or more. Furthermore, the camera does not have to be a hemispherical camera, and the mounting position thereof is naturally not limited to the one shown in FIG. 2.

The alarm device 4 is configured to output an alarm by sound and/or light. In the embodiment, the alarm device 4 includes a buzzer 40 that outputs sound and a lamp 41 that outputs light. For example, the buzzer 40 may be integrated with the lamp 41. The alarm device 4 of the embodiment is a two-color stacked light with a buzzer, and among the sound, the yellow light, and the red light, the alarm can be output in any one of the above modes, or in a combination of two or more of the above modes. The alarm device 4 is used to output an alarm to the operator. Therefore, the alarm device 4 is preferably disposed in a position on the vehicle body 16 that does not interfere with the operation of the operator and is easily visible, for example, on the side in front of the driver's seat 15 as shown in FIG. 2. The alarm device 4 may be something other than a two-color stacked light.

The information processing device 5 is connected to the vehicle control unit 10 and receives the above-mentioned vehicle information from the vehicle control unit 10. The information processing device 5 is connected to the imaging device 3 and receives video data acquired by the imaging device 3. The information processing device 5 is connected to the alarm device 4 and controls the alarm device 4.

The information processing device 5 includes an event detection unit 50. The event detection unit 50 detects multiple hazardous events defined regarding the behavior or cargo handling state of the cargo handling vehicle 1 in a distinguishable manner based on the vehicle information received from the vehicle control unit 10. The event detection unit 50 uses the vehicle information and, if necessary, a preset threshold value to determine whether or not a defined hazardous event has occurred.

The information processing device 5 further includes an alarm control unit 51. The alarm control unit 51 is triggered by the event detection unit 50 detecting any of the hazardous events, activates the alarm device 4, and causes the alarm device 4 to output an alarm in the form of sound and/or light. The alarm control unit 51, as described below, causes the alarm device 4 to output an alarm in a preset form for each of the hazardous events.

In the example, after the event detection unit 50 detects any of the hazardous events, the alarm control unit 51 continues to output an alarm until it is detected based on the vehicle information from the vehicle control unit 10 that the operation unit 14 has been operated in a predetermined manner. That is, the condition for stopping the alarm is to operate the operation unit 14 in the predetermined manner. The operation in the predetermined manner may be, for example, turning off the accelerator, placing the shift lever in neutral, placing the cargo handling lever in neutral, and/or operating a button on the operation unit 14.

Instead, the alarm control unit 51 may output an alarm merely while the hazardous event is occurring or may output an alarm merely for a certain period of time (for example, several tens of seconds) from the moment the hazardous event occurs.

The information processing device 5 further includes a restriction command unit 52. When the event detection unit 50 detects a part of predetermined hazardous events (hereinafter, sometimes referred to as "specific hazardous events") among the hazardous events, the restriction command unit 52 uses such detection as a trigger to transmit a restriction command to the vehicle control unit 10 of the cargo handling vehicle 1 in order to restrict the operation of the cargo handling vehicle 1. As described later, the contents of the vehicle restrictions for each of the specific hazardous events are set in advance.

When receiving the restriction command from the restriction command unit 52, the vehicle control unit 10 restricts the operation of the cargo handling vehicle 1 in accordance with the contents of the command. Specifically, the vehicle control unit 10 restricts the traveling operation of the traveling device 11 and/or the cargo handling operation of the cargo handling device 12.

The restriction of the traveling operation is a restriction on the traveling speed and acceleration of the cargo handling vehicle 1. For example, the restriction of the traveling speed may involve restricting the maximum traveling speed to a non-zero value that is lower than the maximum traveling speed before the restriction. In addition, the restriction of the acceleration is set to a value lower than the acceleration before the restriction, that is, the acceleration of the cargo handling vehicle 1 in response to the accelerator operation is set to a value lower than the acceleration before the restriction.

The restriction of the cargo handling operation is, for example, a restriction on the lifting operation of the forks 17 of the cargo handling device 12. Specifically, the restriction is to restrict the maximum lift speed (raising and lowering speed) to a non-zero value that is lower than the maximum lift speed before the restriction. For example, in addition to or instead of restricting the lifting operation, there may be other restrictions, such as restrictions on the reach operation (for example, reach speed).

During such a restriction, in response to the operator operating the operation unit 14 in the predetermined manner, the vehicle control unit 10 is configured to remove the above-mentioned restrictions. In other words, the condition for removing the restriction is to operate the operation unit 14 in the predetermined manner. For example, during the restriction of traveling operation, when a part of the sensors in the sensor group 13 detects that the operator has released the accelerator and/or placed the shift lever in neutral, in response to such detection, the vehicle control unit 10 may remove the restriction on the traveling operation. For example, during the restriction of cargo handling operation, when a part of the sensors in the sensor group 13 detects that the operator has placed the cargo handling lever (for example, the lift lever) in neutral, in response to such detection, the vehicle control unit 10 may remove the restriction on the cargo handling operation.

The information processing device 5 further includes a recording processing unit 53. The recording processing unit 53 links, for example, vehicle information, time information regarding operation time, date, time, operator identification information, etc., records the aforementioned in a storage medium 55 as the operating status, and also transmits the aforementioned to the network server 6 via the network N.

In addition, when any of the hazardous events occurs and is detected by the event detection unit 50, the recording processing unit 53 links the information on the occurrence of a hazardous event with time information and operator identification information, records the aforementioned in the storage medium 55, and also transmits the aforementioned to the network server 6 via the network N.

The information processing device 5 is equipped with a reader (not shown). The reader reads an ID card (not shown) carried by the operator of the cargo handling vehicle 1, and the recording processing unit 53 can record vehicle information and information on the occurrence of hazardous events in association with the operator. In this way, the operating status for each of the operators may be managed.

The recording processing unit 53 is triggered by the detection of any of the hazardous events by the event detection unit 50, and transmits video captured by the imaging device 3 for a certain period of time before and after the occurrence of a hazardous event to the network server 6 via the network N. Such a recording processing unit 53 may be substantially the same as the one disclosed in Patent Literature 1 and the like, and therefore will not be described in detail.

The information processing device 5 further includes a notification transmission unit 54. The information processing device 5 has an email sending function. The notification transmission unit 54 may be triggered by the event detection unit 50 detecting any of the hazardous events, and wirelessly send an email including a notification notifying the administrator terminal 7 (email address thereof) of the occurrence of the hazardous event via the network N, without going through the network server 6. For example, in a configuration in which the network server 6 notifies the administrator terminal 7 after receiving a notification of the occurrence of a hazardous event from the information processing device 5, it takes time for the administrator terminal 7 to receive the notification. By not going through the network server 6 as described above, the time can be reduced.

The information processing device 5 further includes the storage medium 55. The storage medium 55 records and stores information acquired from the vehicle control unit 10, the imaging device 3, the network server 6, the administrator terminal 7, etc. The storage medium 55 stores programs for implementing the various functions of the information processing device 5. The storage medium 55 may be composed of a volatile memory or a non-volatile memory.

The information processing device 5 further includes a communication device 56. As described above, the communication device 56 is used for wireless communication between the network server 6 and the administrator terminal 7 via the network N of the information processing device 5.

Each of the above-mentioned units 50 to 54 of the information processing device 5 is a functional unit that is realized by one or more processors of the information processing device 5 executing a program stored in the storage medium 55.

FIG. 3 shows examples of detectable hazardous events according to the embodiment and alarm modes and vehicle restriction modes set for each of the hazardous events. In FIG. 3, "○" means that the corresponding alarm/restriction is implemented, and "-" means that the corresponding alarm/restriction is not implemented. It should be noted that the hazardous events and the corresponding alarm modes and vehicle restriction modes shown in FIG. 3 are merely examples.

The occurrence of hazardous events related to the traveling behavior of the cargo handling vehicle 1, such as "speeding", "sudden turn", "sudden deceleration (sudden braking)", "sudden start", or "collision with objects" is, similar to Patent Literature 1, determined by the event detection unit 50 based on a comparison of values related to traveling, such as traveling speed, turning speed, acceleration, and turning angle, contained in the vehicle information, with preset threshold values.

Furthermore, the occurrence of hazardous events related to the cargo handling state of the cargo handling vehicle 1, such as "overload" or "cargo collapse", is determined based on information related to cargo handling contained in the vehicle information. For example, when the load of the cargo on the forks 17 measured by the load sensor exceeds a preset threshold value, the event detection unit 50 determines that "overload" has occurred.

"Cargo collapse" refers to cargo falling from the forks 17. When the information related to the cargo handling contained in the vehicle information indicates that the load on the forks 17 has decreased even though the forks 17 have not been raised or lowered, the event detection unit 50 determines that "cargo collapse" has occurred.

"Lift up traveling (with/without cargo)", "Lift down traveling (with/without cargo)", "Lift up, traveling, and turning (with cargo)", and "Lift down, traveling, and turning (with cargo)" are hazardous events related to both traveling and cargo handling behavior (double operation). "Lift up traveling (with/without cargo)"/"Lift down traveling (with/without cargo)" means that the operator is traveling the cargo handling vehicle 1 while raising and lowering the forks 17, regardless of whether there is cargo on the forks 17 or not. "Lift up, traveling, and turning (with cargo)"/"Lift down, traveling, and turning (with cargo)" means that the operator is traveling the turning the cargo handling vehicle 1 while the forks 17 with cargo placed thereon being raised and lowered. The hazardous events occur due to the double operation of the traveling device 11 and the cargo handling device 12, and are determined by the event detection unit 50 based on the information regarding traveling and the information regarding cargo handling contained in the vehicle information.

The hazardous events of FIG. 3 are merely illustrative. It should also be noted that the alarm mode and vehicle restriction mode for each of the hazardous events described below are also merely examples.

The alarm control unit 51 operates the alarm device 4 to output an alarm in response to the event detection unit 50 detecting any of the hazardous events. As shown in FIG. 3, an alarm mode (a combination of sound, yellow light, and red light) is assigned to each of the hazardous events. When a hazardous event is detected, the alarm control unit 51 causes the alarm device 4 to output an alarm in a mode assigned to the detected hazardous event.

Different alarm modes are assigned and set in advance by the system provider or administrator according to the hazard level of the hazardous event. As shown in FIG. 3, in the embodiment, lighting a yellow light is assigned to a hazardous event with a low hazard level, a combination of sounding an alarm and lighting a red light is assigned to a hazardous event with a medium hazard level, and a combination of sounding an alarm, lighting a yellow light, and lighting a red light is assigned to a hazardous event with a high hazard level.

By outputting an alarm, the operator can be notified of the occurrence of a hazardous event. Furthermore, by varying the mode of the alarm, the operator can be informed of the hazard level of the hazardous event that has occurred.

Furthermore, the alert system is configured to impose a vehicle restriction (traveling restriction and/or cargo handling restriction) on the cargo handling vehicle 1 in addition to outputting the above-mentioned alarm when a part of predetermined specific hazardous events that are not of a low hazard level among the hazardous events occurs.

Different vehicle restriction modes are assigned and set in advance by the system provider, administrator, etc. according to the hazard level of the hazardous event. For example, as shown in FIG. 3, for a hazardous event A which is considered to have a low hazard level, it is set such that neither a traveling restriction nor a cargo handling restriction is imposed. For a hazardous event B (an example of a "first specific hazardous event" of the disclosure) which is considered to have a medium hazard level, it is set such that a traveling restriction is imposed but a cargo handling restriction is not imposed. Furthermore, for a hazardous event C (an example of a "second specified hazardous event" of the disclosure) which is considered to have a high hazard level, it is set such that both a traveling restriction and a cargo handling restriction are imposed.

Therefore, even if the event detection unit 50 detects any of the hazardous events A with a low hazard level, the restriction command unit 52 does not transmit a restriction command to the vehicle control unit 10. In other words, there are no vehicle restrictions.

When the event detection unit 50 detects any of the hazardous events B, such detection triggers the restriction command unit 52 to transmit a restriction command to the vehicle control unit 10, which indicates that a traveling restriction is to be imposed but a cargo handling restriction is not to be imposed. When receiving the restriction command, the vehicle control unit 10 restricts the traveling operation. That is, when a hazardous event B with a medium hazard level occurs, a traveling restriction is imposed in addition to an alarm. In the specific example, the restriction is to restrict the maximum traveling speed to a non-zero value that is lower than the maximum traveling speed before the restriction.

When the event detection unit 50 detects any of the hazardous events C, such detection triggers the restriction command unit 52 to transmit a restriction command to the vehicle control unit 10, which indicates that both a traveling restriction and a cargo handling restriction are to be imposed. When receiving the restriction command, the vehicle control unit 10 restricts both the traveling operation and the cargo handling operation. That is, when a hazardous event C with a high hazard level occurs, both a traveling restriction and a cargo handling restriction are imposed in addition to an alarm. In the specific example, the restriction of the traveling operation is as described above, and the restriction of the cargo handling operation is to restrict the maximum lift speed to a non-zero value that is lower than the maximum lift speed before the restriction.

In this way, the alert system merely outputs an alarm when a hazardous event A that is of a low hazard level among the hazardous events occurs. When a specific hazardous event B or a specific hazardous event C occurs, the alert system, in addition to an alarm, imposes a vehicle restriction (traveling restriction and/or cargo handling restriction) in conjunction with the alarm.

The operator may become accustomed to the alarm alone and may not modify his/her own hazardous driving. When a specific hazardous event B or a C specific hazardous event that is of a medium hazard level or a high hazard level occurs, a vehicle restriction is imposed. When the operator realizes the vehicle restriction, he or she may become more aware of the occurrence of a hazardous event. As a result, the effect of promoting deterrence to hazardous driving is expected. In particular, when a hazardous event C (second specific hazardous event) with a high hazard level occurs, both a traveling restriction and a cargo handling restriction are imposed, so that the operator can be made even more aware of the situation.

As described above, the alarm and the vehicle restriction (restriction on traveling operation and/or cargo handling operation) continue until the operator operates the operation unit 14 in a predetermined manner. Such configuration in which the alarm is not stopped and the vehicle restriction is not lifted unless the operator performs a predetermined operation also contributes to making the operator more aware of his/her own hazardous driving.

The specific example restricts the maximum traveling speed and the maximum lift speed to a non-zero value, and does not impose a restriction that would disable traveling operation and cargo handling operation. This is to ensure that the operator can continue working when a specific hazardous event occurs, while making the operator more aware of his/her own hazardous driving.

In the above specific example, although a vehicle restriction mode that imposes a cargo handling restriction but does not impose a traveling restriction is not set, naturally, such a vehicle restriction mode may be set according to the contents and hazard level of the hazardous event.

In addition, the information processing device 5 is preferably configured to be able to define and add a detectable hazardous event, and to assign an alarm mode and a vehicle restriction mode to the additional hazardous event. As an example, the information processing device 5 receives update information (update program) from an external device such as a device of a provider of the alert system or the administrator terminal 7 of an administrator and rewrites the program stored in the storage medium 55 so that the event detection unit 50 can additionally detect a newly defined hazardous event, and the alarm control unit 51 and the restriction command unit 52 are enabled to output an alarm and transmit a restriction command in the mode assigned thereto. This allows a detectable hazardous event to be added later according to the administrator's (client's) request, making the system responsive to a large number of clients.

Second Embodiment

Figure 4:
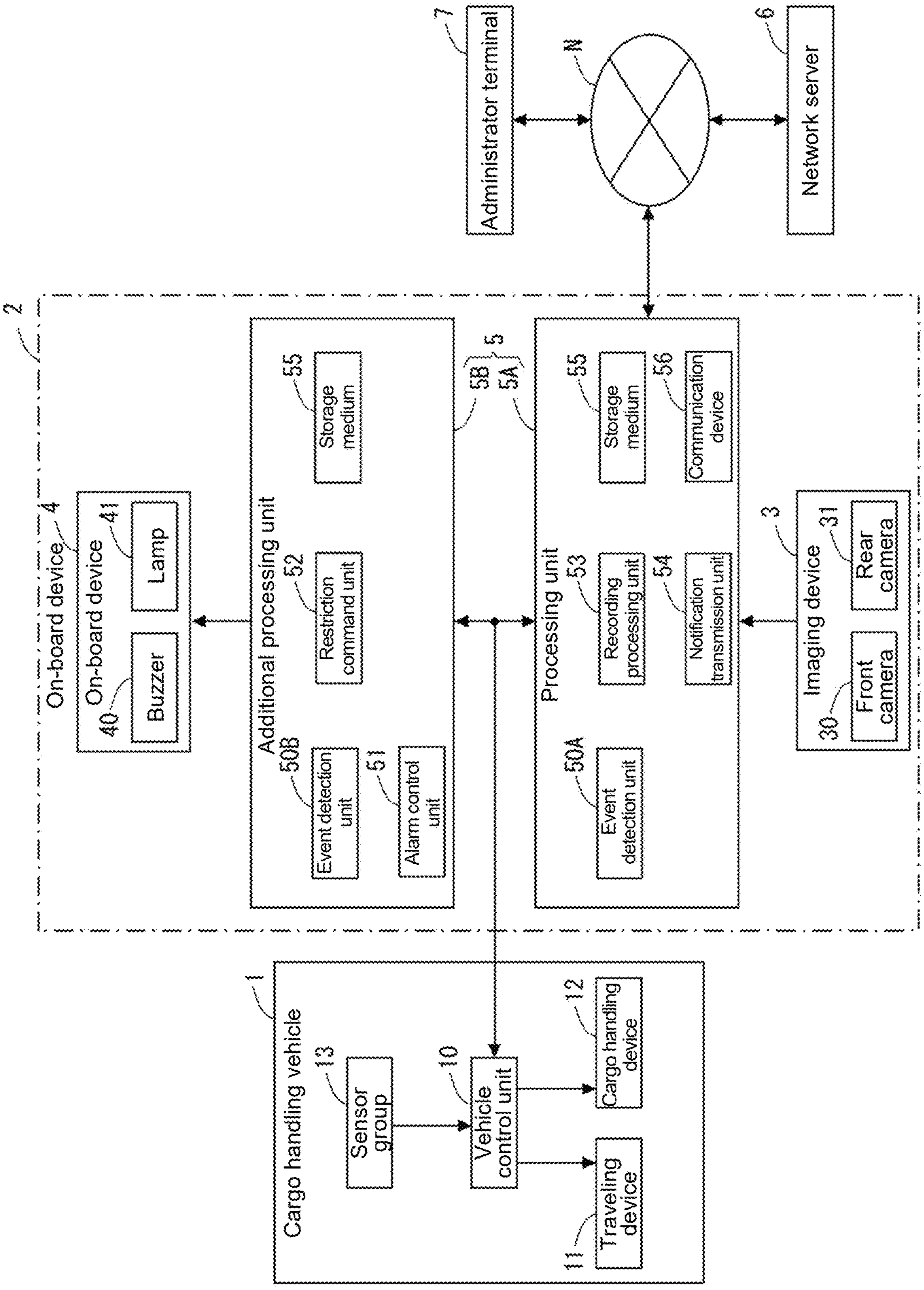
FIG. 4 is a schematic configuration diagram of another exemplary alert system.

A second embodiment is shown in FIG. 4. Description of configurations similar to the configurations of the first embodiment will be omitted. In the alert system of FIG. 4, the information processing device 5 is made up of two units: a processing unit 5A and an additional processing unit 5B. The processing unit 5A, the imaging device 3, the network server 6, and the administrator terminal 7 constitute an operation management system. By adding on the additional processing unit 5B and the alarm device 4 to the operation management system, the operation management system also functions as an alert system.

The processing unit 5A includes an event detection unit 50A (first event detection unit), the recording processing unit 53, the notification transmission unit 54, the storage medium 55, the communication device 56, etc., is connected to the vehicle control unit 10 and the imaging device 3, and is further connected to the additional processing unit 5B. The processing unit 5A in the embodiment is specifically a data logger unit.

The additional processing unit 5B includes an event detection unit 50B (second event detection unit), the alarm control unit 51, the restriction command unit 52, the storage medium 55, etc., and is connected to the vehicle control unit 10, the processing unit 5A, and the alarm device 4. The additional processing unit 5B in the embodiment is specifically a control box.

Vehicle information is transmitted from the vehicle control unit 10 to the processing unit 5A and the additional processing unit 5B, and a hazardous event is detected by the event detection unit 50A and the event detection unit 50B. For example, among the hazardous events in FIG. 3, a part of the hazardous events is detected by the event detection unit 50A, and the remaining hazardous events are detected by the event detection unit 50B. The event detection unit 50B of the additional processing unit 5B is preferably configured to be able to detect a hazardous event that is not detected by the event detection unit 50A of the existing processing unit 5A. This is because a new hazardous event may be additionally detected.

In the embodiment, when the event detection unit 50A detects a hazardous event, the recording processing unit 53 and the notification transmission unit 54 perform the same operations as in the first embodiment. As an alarm system, when the event detection section 50A detects a hazardous event, the information is transmitted to the additional processing unit 5B. In the additional processing unit 5B, the alarm control unit 51 activates the alarm device 4 to output an alarm in a preset alarm mode in response to the detected hazardous event. In addition, if the detected hazardous event is a specific hazardous event, the restriction command unit 52 also sends a restriction command to the vehicle control unit 10 in order to have the vehicle control unit 10 implement a vehicle restriction (traveling restriction and/or cargo handling restriction) set for the specific hazardous event.

When the event detection unit 50B detects a hazardous event, the alarm control unit 51 and the restriction command unit 52 perform the same operations as in the first embodiment. As an operation management system, when the event detection unit 50B detects a hazardous event, the information is transmitted to the processing unit 5A. In the processing unit 5A, the recording processing unit 53 transmits information on the occurrence of the hazardous event and video captured by the imaging device 3 before and after the occurrence of the hazardous event to the network server 6. In addition, the notification transmission unit 54 sends an email including a notification of the occurrence of the hazardous event to the administrator terminal 7 without going through the network server 6.

The second embodiment can be expected to have the same effects as the first embodiment. Furthermore, the second embodiment is advantageous in that the operation management system can also function as an alert system by adding on the additional processing unit 5B and the alarm device 4 to the operation management system.

Both the first embodiment and the second embodiment are merely examples. The disclosure is not limited to the above-described embodiments, and it will be obvious to those skilled in the art that the disclosure can be embodied in various forms without departing from the spirit and scope of the disclosure.

What is claimed is:

1. An alert system, comprising:

a vehicle control unit, controlling a traveling device and a cargo handling device of a cargo handling vehicle;

an alarm device, mounted on the cargo handling vehicle and outputting an alarm by sound and/or light; and an information processing device, mounted on the cargo handling vehicle and connected to the vehicle control unit and the alarm device, wherein the information processing device comprising:

an event detection unit which determines a plurality of hazardous events in a distinguishable manner based on vehicle information regarding the cargo handling vehicle from the vehicle control unit, wherein the hazardous events are determined based on the following:

comparing preset thresholds and dynamic operational parameters of the cargo handling vehicle comprising at least one of a traveling speed, an acceleration, a turning speed; and detecting that the traveling device and the cargo handling device are being operated concurrently, an alarm control unit which activates the alarm device when the event detection unit detects any of the hazardous events, and causes the alarm device to output an alarm, and a restriction command unit which transmits a restriction command to the vehicle control unit to restrict operation of the cargo handling vehicle when the event detection unit detects a part of specific hazardous events among the hazardous events, wherein the vehicle control unit restricts traveling operation of the traveling device and/or cargo handling operation of the cargo handling device when receiving the restriction command from the information processing device.

2. The alert system according to claim 1, wherein the specific hazardous events comprise a first specific hazardous event and a second specific hazardous event different from the first specific hazardous event, and the vehicle control unit restricts merely one of the traveling operation and the cargo handling operation when the event detection unit detects the first specific hazardous event, and restricts both the traveling operation and the cargo handling operation when the event detection unit detects the second specific hazardous event.

3. The alert system according to claim 1, wherein restriction of the traveling operation is to set the maximum traveling speed of the cargo handling vehicle to a non-zero value that is lower than the maximum traveling speed before the restriction.

4. The alert system according to claim 1, wherein the cargo handling device is provided with forks for supporting cargo, and restriction of the cargo handling operation is to set the maximum lift speed of the forks to a non-zero value that is lower than the maximum lift speed before the restriction.

5. The alert system according to claim 1, wherein the vehicle control unit removes the restriction when it is detected that an operation unit for operating the cargo handling vehicle has been operated in a predetermined manner during the restriction of the traveling operation and/or the cargo handling operation.

6. The alert system according to claim 1, wherein the alarm control unit continues to output an alarm by sound and/or light until it is detected that an operation unit for operating the cargo handling vehicle has been operated in a predetermined manner based on the vehicle information after detection of the hazardous event.

7. The alert system according to claim 1, wherein the information processing device comprises a processing unit comprising the event detection unit and an additional processing unit comprising the alarm control unit and the restriction command unit.

8. The alert system according to claim 7, wherein the processing unit comprises a first event detection unit as the event detection unit, the additional processing unit further comprises a second event detection unit as the event detection unit, and the second event detection unit detects the hazardous event that is not detected by the first event detection unit.

9. The alert system according to claim 1, wherein the cargo handling vehicle is a forklift.

10. The alert system according to claim 1, wherein the traveling device and the cargo handling device being operated concurrently comprises the cargo handling vehicle traveling while forks of the cargo handling device are being raised or lowered.

* * * * *